United States Patent [19]

Johnson et al.

[11] Patent Number: 4,872,181
[45] Date of Patent: Oct. 3, 1989

[54] LASER RESONATOR WITH LASER MEDIUM EXHIBITING THERMALLY INDUCED BIREFRINGENCE

[75] Inventors: Bertram C. Johnson, Sunnyvale; Richard L. Herbst, Palo Alto, both of Calif.

[73] Assignee: Spectra-Physics, San Jose, Calif.

[21] Appl. No.: 274,405

[22] Filed: Nov. 21, 1988

[51] Int. Cl.$^4$ .......................... H01S 3/08; H01S 3/11
[52] U.S. Cl. ....................................... 372/106; 372/10; 372/17; 372/92; 372/93; 372/108; 372/98; 372/105
[58] Field of Search .................... 372/39, 17, 9, 10, 11, 372/92, 93, 95, 108, 26, 27, 98, 105, 106

[56] References Cited

U.S. PATENT DOCUMENTS

| | | | |
|---|---|---|---|
| 3,564,454 | 2/1971 | Hook et al. | 372/106 |
| 4,048,515 | 9/1977 | Liu | 372/93 |
| 4,127,827 | 11/1978 | Barry | 372/93 |
| 4,156,209 | 5/1979 | Herbst et al. | 372/95 |
| 4,197,513 | 4/1980 | Bell et al. | 372/92 |
| 4,276,518 | 6/1981 | Ferguson | 372/26 |
| 4,310,808 | 1/1982 | Byer et al. | 372/95 |
| 4,360,925 | 11/1982 | Brosnan et al. | 372/95 |
| 4,752,931 | 6/1988 | Dutcher et al. | 372/10 |

FOREIGN PATENT DOCUMENTS 2089105 6/1982 United Kingdom ................ 372/106

OTHER PUBLICATIONS

Heritier et al., "Thermal Effects in High Power Q-Switched Lasers".

Primary Examiner—William L. Sikes
Assistant Examiner—Georgia Y. Epps
Attorney, Agent, or Firm—Fliesler, Dubb, Meyer & Lovejoy

[57] ABSTRACT

A laser resonator generates a polarized output beam with a laser medium exhibiting thermally induced birefringence and a Y-shaped resonant cavity. A lasing axis extends between a first side and a second side of the laser medium, Radiation transmitted out of the first side of the laser medium has its polarization rotated by 90 degrees and is guided back along the lasing axis into the laser medium for a second pass. A polarizer is mounted on the second side of the laser medium for guiding the radiation having a first polarization along a first path and radiation having a second polarization that is 90 degrees from the first polarization along a second path. Both the first path and the second path include the lasing axis of the laser medium and form a Y-shaped resonant cavity. Along the first path, a high reflecting means is provided to reflect the radiation back along the first path. Along the second path, an output coupler is provided by which a component of the radiation is reflected back along the second path and a component is transmitted as the polarized output beam. A Q-switch is provided in the first path between the polarizer and the high reflecting means, or in the second path between the polarizer and the output coupler, or in both paths.

19 Claims, 2 Drawing Sheets

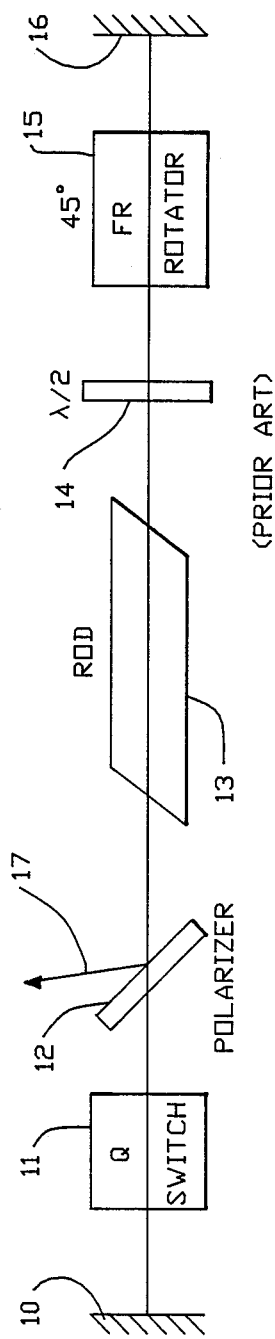
FIG.-1 (PRIOR ART)
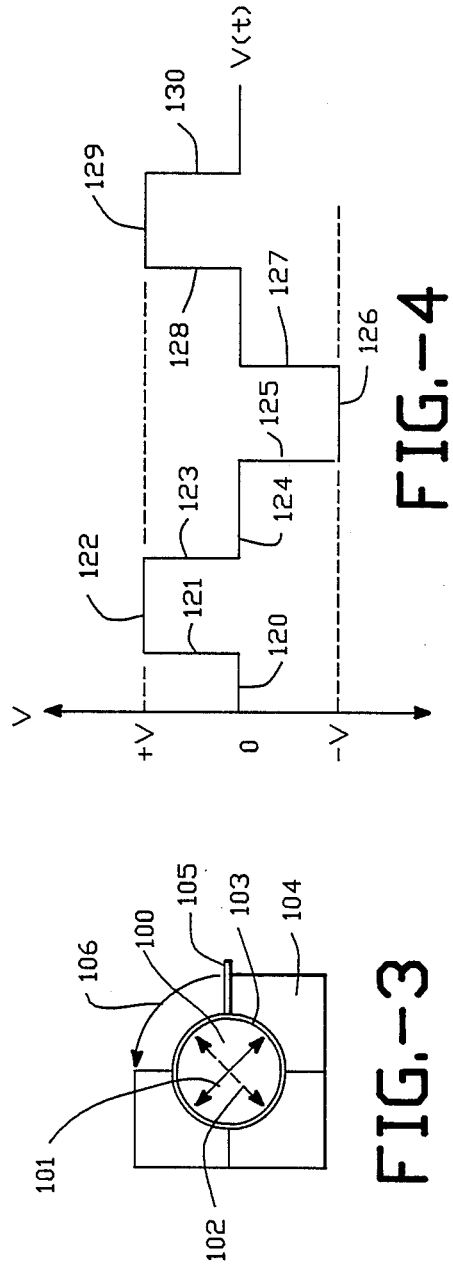
FIG.-3
FIG.-4

LASER RESONATOR WITH LASER MEDIUM EXHIBITING THERMALLY INDUCED BIREFRINGENCE

FIELD OF THE INVENTION

The present invention relates to laser resonators utilizing laser media that exhibit birefringence; and more particularly to a laser resonator design by which birefringence in the laser medium is compensated and a polarized output beam is generated.

DESCRIPTION OF RELATED ART

Many laser media exhibit thermally induced birefringence under high thermal loading conditions. For instance, a YAG rod exhibits a radially varying birefringence under thermal stress. Therefore, when operating a laser with a laser medium, like YAG, GSAG, GSGG, or YSGG, polarization of the beam within the resonator cavity is difficult to control under conditions of high thermal loading.

In the prior art, laser amplifiers have been designed to compensate for the thermal birefringence by passing the beam to be amplified through the birefringent material with a first polarization then rotating the polarization by 90 degrees and passing the rotated beam through the birefringent material. Thus the polarization effects of the first pass through the material are compensated by the equal and opposite polarization effects that take place during the second pass through the material. As set out in Heritier et al., "Thermal Effects in High Power Q-Switched Lasers" Presented at the January 1988 SPIE OE-LASE conference, such amplifiers comprise a polarizer, a birefringent rod, a 45 degree Faraday rotator, and a high reflecting mirror aligned along an optical path. The input beam passes through the polarizer with a first polarization into the birefringent rod, is rotated by 45 degrees in its first pass through the Faraday rotator, is reflected off the mirror into the Faraday rotator a second time, for a total of 90 degrees rotation, and through the birefringent rod. At the polarizer, the rotated beam is reflected rather than transmitted, and the reflected component is the compensated output of the amplifier. An alternative embodiment suggested by Heritier et al. involves using a first birefringent rod, a 90 degree rotator and a second birefringent rod. In the second embodiment, the birefringence of rod 1 is compensated by the birefringence of rod 2.

It is desirable, however, to build laser resonators with compensation for thermally induced birefringence. One prior art design is shown in FIG. 1 which is similar to the single rod amplifier taught by Heritier et al. The resonator of FIG. 1 includes a high reflecting mirror 10, a Q-switch 11, a polarizer plate 12, a birefringent rod 13, a half-wave plate 14, a 45 degree Faraday rotator 15, and a second mirror 16. In operation, when the Q-switch is turned on light having first polarization is transmitted through the polarizer into the rod and into the half-wave plate where it is slightly rotated. It then enters the Faraday rotator, strikes mirror 16 and goes back through the Faraday rotator for a total of 90 degrees rotation. When the rotated beam passes through the half-wave plate 14, it is tilted slightly away from the first polarization, passes through the rod and a component 17 of the beam is reflected by the polarizer as the output. This resonator design can be referred to as a polarization coupled output resonator.

A problem with the polarization coupled output shown in FIG. 1 is known as hold off. In particular, the cavity will tend to resonate even when the Q-switch is turned off due to leakage of the components and has therefore proved to be not a commercially feasible design for high power laser resonators.

SUMMARY OF THE INVENTION

Present invention is an apparatus generating a polarized output beam comprising of laser medium exhibiting thermally induced birefringence. A lasing axis extends between a first side and a second side of the laser medium. Radiation transmitted out of the first side of the laser medium has its polarization rotated by 90 degrees and is guided back along the lasing axis into the laser medium for a second pass. A polarizer is mounted on the second side of the laser medium for guiding the radiation having a first polarization along a first path and radiation having a second polarization that is 90 degrees from the first polarization along a second path. Both the first path and the second path include the lasing axis of the laser medium and form a Y-shaped resonant cavity. Along the first path, a high reflecting means is provided to reflect the radiation back along the first path. Along the second path, an output coupler is provided by which a component of the radiation is reflected back along the second path and a component is transmitted as the polarized output beam.

According to one aspect of the present invention, a Q-switch is provided in the first path between the polarizer and the high reflecting means, or in the second path between the polarizer and the output coupler, or in both paths.

According to another aspect of the present invention, the Q-switch in the second path between the output coupler and the polarizer, includes a controllable Pockels cell by which the Q-switch can either transmit radiation having the second polarization when enabled so that the component transmitted by the output coupler has the second polarization, or rotate the radiation by 90 degrees so that the component transmitted by the output coupler has the first polarization. According to this embodiment, the polarization of the output beam can be switched between the first polarization and the second polarization automatically by controlling the polarity of the voltage applied to the Pockels cell in the Q-switch.

According to the present invention, a high power laser resonator with a thermal-birefringence compensated polarized output is provided which further includes the capability of selecting the polarization of the output beam automatically.

Further aspects and advantages of the present invention will be seen upon study of the figures, the detailed description and the claims.

BRIEF DESCRIPTION OF THE FIGURES

FIG. 1 is a schematic diagram of a prior art laser resonator with polarization coupled output.

FIG. 3 is a diagram of a rotatable quarter-wave plate for use in the system of FIG. 2.

FIG. 4 is a timing diagram of the signal V(t) which is generated by the power supply in the system of FIG. 2 according to one embodiment.

DETAILED DESCRIPTION

Figure 2:
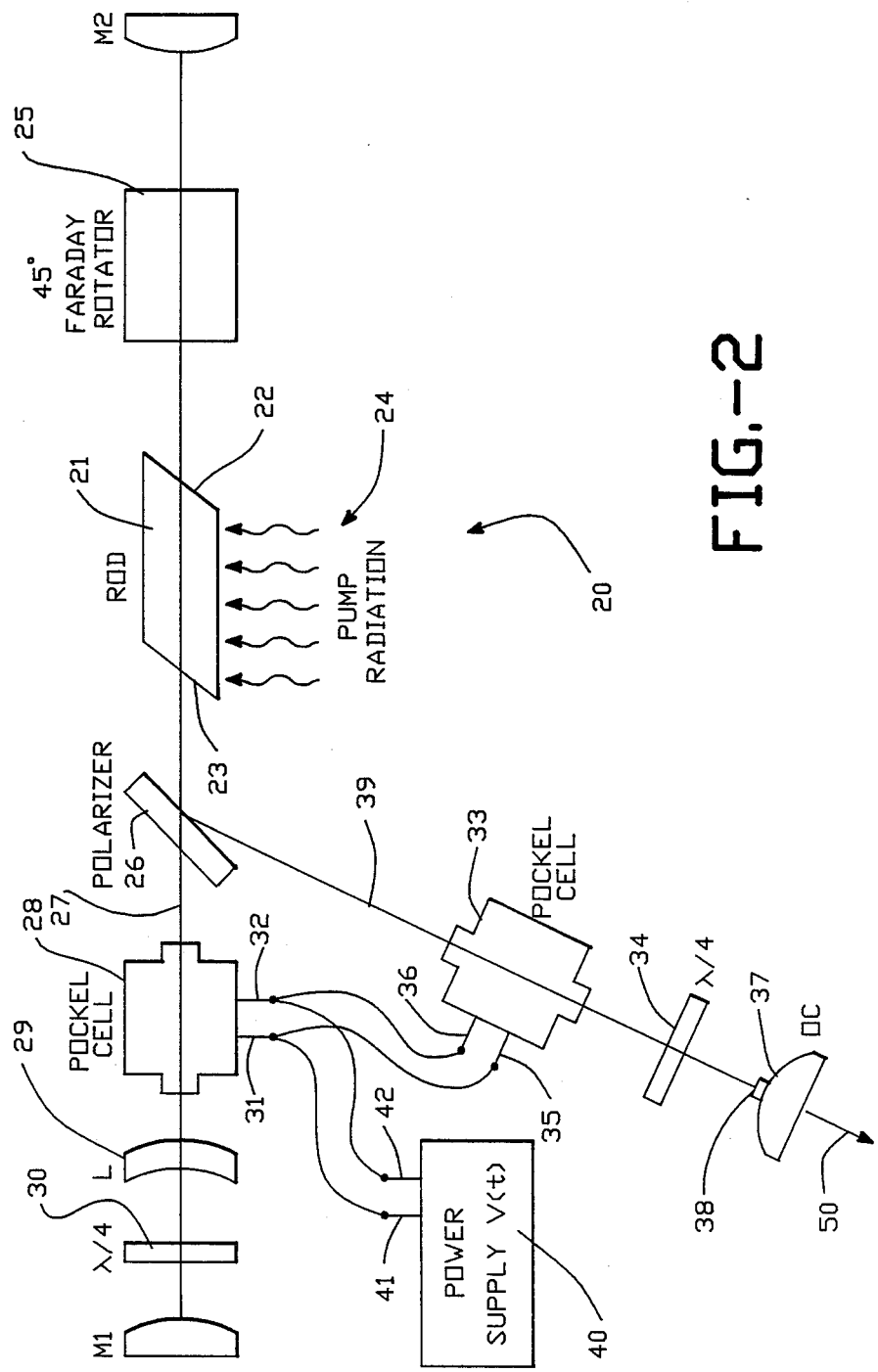
FIG. 2 is a schematic diagram of a preferred embodiment of the present invention.

With reference to FIGS. 2, 3 and 4, a detailed description of a preferred embodiment of the present invention is described.

As shown in FIG. 2, a Y-shaped laser resonator 20 includes a first segment with a rod shaped laser medium, such as Nd:YAG, exhibiting thermally induced birefringence under conditions of high thermal loading. The rod 21 includes a first side 22 and a second side 23. The rod is pumped by xenon flashlamps which generate pump radiation 24 for driving the laser medium.

The rod 21 is characterized by a lasing axis which runs between the first side 22 and the second side 23. Radiation is transmitted along the lasing axis into the laser resonator cavity. The cavity includes on the first side 22 of the rod 21 a 45 degree Faraday rotator 25 and a high reflecting mirror M2. Faraday rotator 25 and mirror M2 operate to rotate the polarization of radiation transmitted along the lasing axis from the first side 22 of the rod by 90 degrees and to transmit that radiation along the lasing axis into the first side 22 of the rod 21.

On the second side 23 of the rod, the cavity of the Y-shaped resonator 20 is characterized by a first path and a second path. A polarizer plate 26 is mounted adjacent the second side 23 of the rod 21. Polarizer plate 26 transmits a first component of the radiation having a first polarization along segment 27 through Pockels cell 28. From Pockels cell 28, the radiation goes through lens 29, to quarter-wave plate 30 and on to high reflecting mirror M1. Lens 29 is used for matohing thermal lensing in the rod, with the specific mirror curvatures as known in the art, and could be eliminated if mirror curvatures were selected appropriately. The quarter-wave plate 30, Pockels cell 28, and polarizer plate 26 operate as a Q-switch in response to the control signal V(t) applied to terminals 31 and 32.

The polarizer plate 26 reflects a second component of the radiation having a second polarization which is 90 degrees from the first polarization, along segment 39 of the second path. The second path includes a Pockels cell 33 and a quarter-wave plate 34. The Pockels cell 33, quarter-wave plate 34, and polarizer plate 26 combination operates as a Q-switch in response to the control signal V(t) applied to terminals 35 and 36 of the Pockels cell 33. After passing through the quarter-wave plate 34, the radiation strikes an output coupler 37. In the preferred embodiment, the output coupler 37 is a dot mirror which includes a high reflecting surface 38 in a relatively small dot at the center of the beam and transmits radiation which falls outside of the high reflecting surface 38. The transmitted radiation 50 is a highly polarized output beam of the laser resonator.

Other output couplers, such as a partially reflecting mirror, or a modified dot mirror with a smoothly graded edge profile as known in the art, could be utilized as known in the art.

A power supply 40 generates a control signal V(t) on lines 41 and 42 having a polarity and a magnitude. In the preferred embodiment, the lines 41 and 42 are connected to the terminals 31 and 32 of Pockels cell 28 and the terminals 35 and 36 of Pockels cell 33. Therefore, the Q-switch along path 1 and the Q-switch along path 2 operate based on the same input control signal V(t).

For lower power applications, one or both of the Q-switches in the first and second paths can be eliminated.

In operation, when the Q-switches are turned on, radiation with the first polarization is transmitted through the polarizer 26 into the rod 21. From the rod 21 it passes through the Faraday rotator 25 to mirror M2 and back through the Faraday rotator 25 and into the rod 21. The rotated beam is then reflected by the polarizer 26 along the second path to the output coupler 37. The light reflected by the output coupler proceeds to the polarizer 26 through the rod 21 and is rotated again by the Faraday rotator 25 and mirror M2 by 90 degrees. The beam is then realigned with the first polarization and will be transmitted by the polarizer along the first path to the high reflecting mirror M1.

Therefore, the resonant path in the Y-shaped resonator 20 includes four passes through the rod 21, two passes having the first polarization and two passes having the second polarization so that the birefringence of the rod 21 is compensated, even for very high powers.

In high power laser resonators, it is desirable to have a Q-switch in both paths of the resonator 20 as shown in FIG. 2. This will prevent unwanted oscillation from occurring when the switches are turned off.

The laser resonator 20 according to the present invention can also provide the output beam 39 with a selectable polarization by controlling the Pockels cell 33 or the quarter-wave plate 34 to either cancel each other's effect when turned on, or to add to each other's effect. For instance, the quarter-wave plate 34 will be aligned as known in the art with a fast axis 45 degrees from the second polarization. The Pockels cell 33 will have no effect on the beam when it is turned off. However, when it is turned on by the control signals V(t) supplied at terminals 35 and 36, it will have a fast axis aligned with the slow axis of the quarter-wave plate 34 in order to cancel out the effects of the quarter-wave plate. In this instance, the polarization of light transmitted through the Pockels cell 33 and the quarter-wave plate 34 is unaffected.

However, if the Pockels cell fast axis is aligned with the fast axis of the quarter wave plate 34 when the Pockels cell is enabled, the effect of the Pockels cell will be additive with that of the quarter-wave plate, and the polarization of the output beam will be rotated by 90 degrees.

This selective alignment of the axes of the quarter-wave plate and the axes of the Pockels cell can be accomplished by having a manually rotatable quarter-wave plate 34 as shown in FIG. 3 or by controlling the Polarity of the control signal V(t) supplied by the power supply, as shown in FIG. 4.

In FIG. 3, a circular quarter-wave plate 100 is shown with a fast axis 101 aligned 45 degrees from the vertical and a slow axis 102 that is 90 degrees from the fast axis 101. The quarter-wave plate 100 is mounted on a circular frame 103 which is supported by a guide 104. A handle 105 is attached to the frame 103 of the quarter-wave plate 100 and can be moved by an operator in the guide 104 to the vertical position as indicated by arrow 106. In the vertical position, the fast axis 101 of the quarter-wave plate changes positions with the slow axis, so that the selective alignment of the axes is accomplished.

Alternatively, a fixed quarter-wave plate can be used in conjunction with a power supply generating the control signal V(t) as shown in FIG. 4. It can be seen, the control signal V(t) includes a magnitude V and a polarity. When the control signal magnitude is zero as at point 120, the Q-switches are turned off. The Q-switches are turned on at point 121 when the power supply signal rises to the magnitude +V along segment 122. The Q-switch may be turned off at point 123 and remain off along segment 124 until point 125 when the magnitude of the control signal goes to −V along the segment 126. The Q-switch is turned off at point 127 and remains off until point 128 when it is turned on with the opposite polarity to +V along segment 129. The Q-switch is again turned off at point 130.

A power supply generating the control signal output as shown in FIG. 4 must have rise times of the pulses which turn on the Q-switches of much less than the round trip time of the laser resonator.

During the pulse with a peak at 122, the fast axis of the Pockels cell may be aligned with the fast axis of the quarter-wave plate providing for an additive effect and rotation of the radiation from the second polarization to the first polarization in the output beam. For the pulse with the peak at 126 at magnitude −V, the fast axis of the Pockels cell may be aligned with the slow axis of the quarter-wave plate cancelling out the effect of the quarter-wave plate and allowing for transmission without rotation of polarization of the beam so that the output beam has the second polarization. In this manner, each succeeding pulse of a pulse laser could have opposite polarization. Obviously, the waveform V(t) can be adapted to meet the needs of any particular application requiring reversing polarization of output pulses.

The resonator design shown in FIG. 2 provides a highly polarized output beam with good spatial mode output. The design operates well with flash pumped or continuous wave Q-switched lasers. Further, the output polarization direction can be easily switched.

Due to the longer cavity lifetime achieved in the Y-shaped cavity with a four pass resonant path, longer Q-switched pulses are achieved. Also, mode spacing is reduced, and mode frequency is more slowly varying with time. The design is particularly suited to pulsed systems with very high gain birefringent laser media.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for generating an output beam of coherent radiation comprising:
    a laser medium exhibiting thermally induced birefringence having a lasing axis, for transmitting radiation along the lasing axis, and each point in the laser medium characterized by a radial polarization axis having a first index of refraction and a tangential polarization axis having a second index of refraction, the radial polarization axis intersecting the tangential polarization axis at an angle 90 degrees;
    means, aligned with the lasing axis on a first side of the laser medium, for rotating polarization of radiation transmitted along the lasing axis from the laser medium by essentially 90 degrees to generate rotated radiation and for guiding the rotated radiation along the lasing axis into the laser medium;
    optic means, aligned with the lasing axis on the second side of the laser medium, for guiding radiation having a first polarization along a first path and for guiding radiation having a second polarization along a second path;
    means, on the first path spaced away from the optic means, for reflecting radiation in the first path back along the first path through the optic means into the laser medium;
    means, on the second path spaced away from the optic means, for reflecting a first component of the radiation in the second path back along the second path through the optic means into the laser medium, and transmitting a second component of the radiation in the second path as an output beam.

2. The apparatus of claim 1, further including:
    switching means, mounted in the second path between the optic means and the output means, and responsive to a control signal, for controlling oscillation of radiation along the second path.

3. The apparatus of claim 1, further including:
    switching means, mounted in the first path between the optic means and the means for reflecting, and responsive to a control signal, for controlling oscillation of radiation along the first path.

4. The apparatus of claim 2, wherein the switching means includes:
    a quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and
    controllable means, having a fast axis and a slow axis perpendicular to the fast axis, the slow axis being aligned with the fast axis of the quarter-wave plate, for retarding in response to the control signal a component of radiation having polarization aligned with the slow axis by ¼ wavelength with respect to a component having polarization aligned with the fast axis in response to the control signal, whereby the effect of the quarter-wave plate is cancelled.

5. The apparatus of claim 2, wherein the switching means includes:
    a quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and
    controllable means, having a fast axis and a slow axis perpendicular to the fast axis, the fast axis being aligned with the fast axis of the quarter-wave plate, for retarding in response to the control signal a component of radiation having polarization aligned with the slow axis by ¼ wavelength with respect to a component having polarization aligned with the fast axis, whereby the polarization of radiation transmitted through the switching means in response to the control signal is rotated by 90 degrees.

6. The apparatus of claim 2, wherein the control signal has a polarity and a magnitude, and the switching means includes:

quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and controllable means, having a first axis and a second axis perpendicular to the first axis, for retarding, in response to the magnitude of the control signal, a component of radiation having polarization aligned with the second axis by ¼ wavelength with respect to a component having polarization aligned with the first axis, and for aligning, in response to the polarity of the control signal, the first axis with the fast axis of the quarter-wave retarding means, whereby the polarization of radiation transmitted through the switching means in response to the control signal is rotated by 90 degrees, or aligning the first axis 90 degrees from the fast axis of the quarter-wave retarding means, whereby the effect of the quarter-wave retarding means is cancelled.

7. The apparatus of claim 2, wherein the switching means includes:

a quarter-wave retarding means, having a fast axis and a slow axis perpendicular to the fast axis, for retarding a component of radiation having polarization aligned with the slow axis by ¼ wavelength with respect to a component having polarization aligned with the fast axis;

controllable means, having a fast axis and a slow axis perpendicular to the fast axis, the fast axis being aligned with 45 degrees from the second polarization, for retarding in response to the control signal a component of radiation having polarization aligned with the slow axis by ¼ wavelength with respect to a component having polarization aligned with the fast axis; and means, coupled to the quarter-wave retarding means, for aligning the fast axis of the quarter-wave retarding means selectively with the first axis of the controllable means, whereby the polarization of radiation transmitted through the switching means in response to the control signal is rotated by 90 degrees, or with the second axis of the controllable means, whereby the effect of the quarter-wave retarding means is cancelled.

8. The apparatus of claim 1, further including:

means, in the second path, for selecting an output polarization for the output beam in response to a control signal; and means for supplying the control signal to the means for selecting.

9. An apparatus for generating an output beam of polarized coherent radiation comprising:

a laser medium, having a first side, a second side and a lasing axis extending between the first side and the second side, for transmitting radiation along the lasing axis;

means, on a first side of the laser medium, for rotating polarization of radiation transmitted along the lasing axis from the laser medium by 90 degrees to generate rotated radiation and for guiding the rotated radiation along the lasing axis into the laser medium;

polarizer means, on the second side of the laser medium, for guiding radiation having a first polarization along a first path and for guiding radiation having a second polarization rotated 90 degrees from the first polarization along a second path;

means, on the first path spaced away from the polarizer means, for reflecting radiation in the first path back along the first path;

means, on the second path spaced away from the polarizer means, for reflecting a first component of the radiation in the second path back along the second path and transmitting a second component of the radiation in the second path as an output beam.

10. The apparatus of claim 9, further including:

switching means, mounted in the second path between the polarizer means and the output means, and responsive to a control signal, for controlling oscillation of radiation along the second path.

11. The apparatus of claim 9, further including:

switching means, mounted in the first path between the polarizer means and the means for reflecting, and responsive to a control signal, for controlling oscillation of radiation along the first path.

12. The apparatus of claim 10, wherein the switching means includes:

a quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and controllable means, having a fast axis and a slow axis perpendicular to the fast axis, the slow axis being aligned with the fast axis of the quarter-wave plate, for retarding in response to the control signal a component of radiation having polarization aligned with the slow axis by ¼ wavelength with respect to a component having polarization aligned with the fast axis in response to the control signal, whereby the effect of the quarter-wave plate is cancelled.

13. The apparatus of claim 10, wherein the switching means includes:

a quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and controllable means, having a fast axis and a slow axis perpendicular to the fast axis, the fast axis being aligned with the fast axis of the quarter-wave plate, for retarding in response to the control signal a component of radiation having polarization aligned with the slow axis by ¼ wavelength with respect to a component having polarization aligned with the fast axis, whereby the polarization of radiation transmitted through the switching means in response to the control signal is rotated by 90 degrees.

14. The apparatus of claim 10, wherein the control signal has a polarity and a magnitude, and the switching means includes:

quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and controllable means, having a first axis and a second axis perpendicular to the first axis, for retarding, in response to the magnitude of the control signal, a component of radiation having polarization aligned with the second axis by ¼ wavelength with respect to a component having polarization aligned with the first axis, and for aligning, in response to the polarity of the control signal, the first axis with the fast axis of the quarter-wave retarding means, whereby the polarization of radiation transmitted through the switching means in response to the control signal is rotated by 90 degrees, or aligning the first axis 90 degrees from the fast axis of the quarter-wave retarding means, whereby the effect of the quarter-wave retarding means is cancelled.

15. The apparatus of claim 10, wherein the switching means includes:

a quarter-wave retarding means, having a fast axis and a slow axis perpendicular to the fast axis, for retarding a component of radiation having polarization aligned with the slow axis by ¼ wavelength with respect to a component having polarization aligned with the fast axis;

controllable means, having a fast axis and a slow axis perpendicular to the fast axis, the fast axis being aligned with 45 degrees from the second polarization, for retarding in response to the control signal a component of radiation having polarization aligned with the slow axis by ¼ wavelength with respect to a component of radiation having polarization aligned with the fast axis; and means, coupled to the quarter-wave retarding means, for aligning the fast axis of the quarter-wave retarding means selectively with the first axis of the controllable means, whereby the polarization of radiation transmitted through the switching means in response to the control signal is rotated by 90 degrees, or with the second axis of the controllable means, whereby the effect of the quarter-wave retarding means is cancelled.

16. The apparatus of claim 9, further including:

means, in the second path, for selecting an output polarization for the output beam in response to a control signal; and means for supplying the control signal to the means for selecting.

17. An apparatus for generating an output beam of polarized coherent radiation comprising:

a laser medium exhibiting thermally induced birefringence having a lasing axis, for transmitting radiation along the lasing axis, and each point in the laser medium characterized by a radial polarization axis having a first index of refraction and a tangential polarization axis having a second index of refraction, the radial polarization axis intersecting the tangential polarization axis at an angle 90 degrees;

means, aligned with the lasing axis on a first side of the laser medium, for rotating polarization of radiation transmitted along the lasing axis from the laser medium by essentially 90 degrees to generate rotated radiation and for guiding the rotated radiation along the lasing axis into the laser medium;

optic means, aligned with the lasing axis on the second side of the laser medium, for guiding radiation having a first polarization along a first path and for guiding radiation having a second polarization along a second path;

means, on the first path spaced away from the optic means, for reflecting radiation in the first path back along the first path through the optic means into the laser medium;

means, on the second path spaced away from the optic means, for reflecting a first component of the radiation in the second path back along the second path through the optic means into the laser medium, and transmitting a second component of the radiation in the second path as an output beam;

means, in the second path, for selecting an output polarization for the output beam in response to a control signal; and means for supplying the control signal to the means for selecting.

18. The apparatus of claim 17, wherein the control signal has a polarity and a magnitude, and the means for selecting includes:

quarter-wave retarding means, having a fast axis 45 degrees from the second polarization and a slow axis perpendicular to the fast axis, for retarding a component of radiation having polarization aligned with the slow axis by ¼ wavelength with respect to a component having polarization aligned with the fast axis; and controllable means, having a first axis and a second axis perpendicular to the first axis, for retarding, in response to the magnitude of the control signal, a component of radiation having polarization aligned with the second axis by ¼ wavelength with respect to a component having polarization aligned with the first axis, and for aligning, in response to the polarity of the control signal, the first axis with the fast axis of the quarter-wave retarding means, whereby the polarization of radiation transmitted through the switching means in response to the control signal is rotated by 90 degrees, or aligning the first axis 90 degrees from the fast axis of the quarter-wave retarding means, whereby the effect of the quarter-wave retarding means is cancelled.

19. The apparatus of claim 17, wherein the means for selecting includes:

a quarter-wave retarding means, having a fast axis and a slow axis perpendicular to the fast axis, for retarding a component of radiation having polarization aligned with the slow axis by ¼ wavelength with respect to a component having polarization aligned with the fast axis;

controllable means, having a fast axis and a slow axis perpendicular to the fast axis, the fast axis being aligned with 45 degrees from the second polarization, for retarding in response to the control signal a component of radiation having polarization aligned with the slow axis by ¼ wavelength with respect to a component having polarization aligned with the fast axis; and means, coupled to the quarter-wave retarding means, for aligning the fast axis of the quarter-wave retarding means selectively with the first axis of the controllable means, whereby the polarization of radiation transmitted through the switching means in response to the control signal is rotated by 90 degrees, or with the second axis of the controllable means, whereby the effect of the quarter-wave retarding means is cancelled.

* * * * *